United States Patent
Takahashi

(10) Patent No.: US 7,790,071 B2
(45) Date of Patent: Sep. 7, 2010

(54) CERAMIC HYBRID LENS AND METHOD FOR MANUFACTURING THE SAME

(75) Inventor: Taizo Takahashi, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/270,646

(22) Filed: Nov. 13, 2008

(65) Prior Publication Data
US 2009/0072420 A1    Mar. 19, 2009

Related U.S. Application Data

(62) Division of application No. 11/346,823, filed on Feb. 3, 2006, now Pat. No. 7,471,457.

(30) Foreign Application Priority Data

Feb. 8, 2005    (JP) ............................. 2005-031793

(51) Int. Cl.
*B29D 11/00*    (2006.01)
(52) U.S. Cl. .................... 264/1.38; 264/1.32; 264/1.36; 264/1.7
(58) Field of Classification Search ............... 264/1.38, 264/1.32, 1.36, 1.7
See application file for complete search history.

(56) References Cited

U.S. PATENT DOCUMENTS

| | | | | |
|---|---|---|---|---|
| 4,373,282 A | * | 2/1983 | Wragg | 40/546 |
| 4,555,250 A | * | 11/1985 | Horie et al. | 51/309 |
| 6,433,936 B1 | * | 8/2002 | Carpenter et al. | 359/652 |
| 6,551,530 B2 | | 4/2003 | Koizumi et al. | |
| 2002/0155944 A1 | | 10/2002 | Kurashina et al. | |
| 2003/0181311 A1 | | 9/2003 | Tanaka et al. | |
| 2007/0171538 A1 | | 7/2007 | Kintaka et al. | |
| 2007/0291370 A1 | | 12/2007 | Uehara et al. | |

FOREIGN PATENT DOCUMENTS

| | | |
|---|---|---|
| CN | 1318757 A | 10/2001 |
| CN | 1378990 A | 11/2002 |
| CN | 101031827 A | 9/2007 |
| JP | 2000-180602 A | 6/2000 |
| JP | 2000-281725 A | 10/2000 |
| JP | 2002-187767 A | 7/2002 |

* cited by examiner

*Primary Examiner*—Kat Wyrozebski
*Assistant Examiner*—Xue Liu
(74) *Attorney, Agent, or Firm*—Frishauf, Holtz, Goodman & Chick, P.C.

(57) ABSTRACT

A hybrid lens is provided in which a plastic lens made from an ultraviolet curing resin is affixed to a ceramic lens which uses as a glass material a light transmitting ceramic having a permeability of 70% or larger in a visible radiation range and a particle diameter of 40 micrometers to on the order of 120 micrometers and on which chipping flaws having a depth of 50 micrometers to on the order of 60 micrometers are formed.

4 Claims, 8 Drawing Sheets

CERAMIC HYBRID LENS AND METHOD FOR MANUFACTURING THE SAME

CROSS-REFERENCE TO RELATED APPLICATIONS

The present application is a Divisional Application of U.S. application Ser. No. 11/346,823 filed Feb. 3, 2006, now U.S. Pat. No. 7,471,457, which is incorporated herein by reference.

BACKGROUND OF THE INVENTION

1. Field of the Invention

The present invention relates to a ceramic hybrid lens formed by affixing a plastic lens formed of a layer of resin to a surface of a ceramic lens which is an polishing lens.

2. Description of the Related Art

In recent years, as small and high-performance optical lenses, many aspherical lenses have been used for cameras and reading and recording optical equipment for compact discs.

As the aspherical lenses, many hybrid lenses are used in which a plastic lens of an ultraviolet curing resin is affixed to a surface of a ground or cut glass lens.

To be specific, the hybrid lenses are formed by coating a required amount of ultraviolet curing resin to a mold on which a aspherical surface is formed, placing a glass lens on the resin to extend the resin that has not yet cured so that a lower portion of the resin follows the shape of the mold and is tightly joined to the glass lens, radiating a violet ray from the glass lens side to cure the resin, and removing the resin from the mold after the resin has cured to complete the molding of a plastic lens which is tightly joined to the glass lens, whereby a hybrid lens is obtained in which the plastic lens is affixed to the glass lens.

In the hybrid lens so made, in order to prevent the separation of the plastic lens from the glass lens, it is proposed to mold an aspherical lens by finishing slightly roughly a surface of the glass lens which is to be bonded to the plastic lens when the glass lens is ground or cut and using glass and ultraviolet curing resin materials which can provide refractive indices which are close to each other (for example, Patent Document No. 1).

[Patent Document No. 1] Japanese Unexamined Patent Publication No. 2000-180602

As has been described above, by forming a lens into an aspherical one, a small and high-performance optical lens can be manufactured, and the hybrid lens, in which the plastic lens whose surface is shaped through molding using a mold is formed on the surface thereof, has several advantages: the hybrid lens so made is superior in shaping performance to shape the lens into the aspherical shape to match its application, in mass production and in environment performance in that the hybrid lens is not much affected by environmental factors such as humidity. However, some consideration needs to be made to prevent the separation of the plastic lens from the glass lens on the surface of which the plastic lens is formed.

Due to this, while the surface of the glass lens is made slightly rough to thereby spend no time in grinding, as well as increasing the joining force with which the glass lens is joined to the plastic lens, in this event, since the lens performance is reduced in case materials are not used in which the refractive index of a glass which constitutes a glass material for the glass lens and the refractive index of an ultraviolet curing resin which constitutes a material for the plastic lens are close to each other, there exists an inherent drawback that the refractive index of the lens is limited.

In addition, in the event that the refractive indices of glass and resin are different, when the lens performance is increased by finishing the surface of the glass smooth by polishing, the glass lens and the plastic lens tend to be easily separated from each other, and to cope with this, manhours are increased for surface treatment of the glass lens and adjustment of radiating conditions of ultraviolet rays, leading to a problem that the productivity is deteriorated.

The invention was made to solve the problems and an object thereof is to provide a hybrid lens having a high refractive index and a high performance.

SUMMARY OF THE INVENTION

According to a preferred aspect of the invention, there is provided a ceramic hybrid lens, wherein a plastic lens made from an ultraviolet curing resin is affixed to a ceramic lens in which a light transmitting ceramic having a polycrystalline construction is used as a glass material.

In addition, according to another preferred aspect of the invention, there is provided a method for manufacturing a ceramic hybrid lens comprising the steps of: forming a ceramic lens using as a glass material a light transmitting ceramic having a particle diameter of on the order of 40 micrometers to 120 micrometers by roughly cutting, sanding and grinding the ceramic; coating an ultraviolet curing resin to an aspherical mold and placing the ceramic lens on the resin; forcing the ceramic lens against the mold and radiating an ultraviolet ray so as to cause the ultraviolet curing resin to cure; and thereafter, removing the ultraviolet curing resin so cured together with the ceramic lens from the mold.

Additionally, a further preferred aspect of the invention, there is provided a method for manufacturing a ceramic hybrid lens comprising the steps of: forming a ceramic lens using as a glass material a light transmitting ceramic having a particle diameter of 40 micrometers to on the order of 120 micrometers by roughly cutting, sanding and grinding the ceramic; coating an ultraviolet curing resin to the ceramic lens so formed and forcing the ceramic lens against an aspherical mold; radiating an ultraviolet ray from a ceramic lens side so as to cause the ultraviolet curing resin to cure; and thereafter, separating the mold from the ultraviolet curing resin so cured.

The ceramic hybrid lens according to the invention is a lens which has a high refractive index and in which the plastic lens is made difficult to be separated and hence can constitute a small and high-performance optical lens.

DETAILED DESCRIPTION OF THE PREFERRED EMBODIMENT

Figure 1:
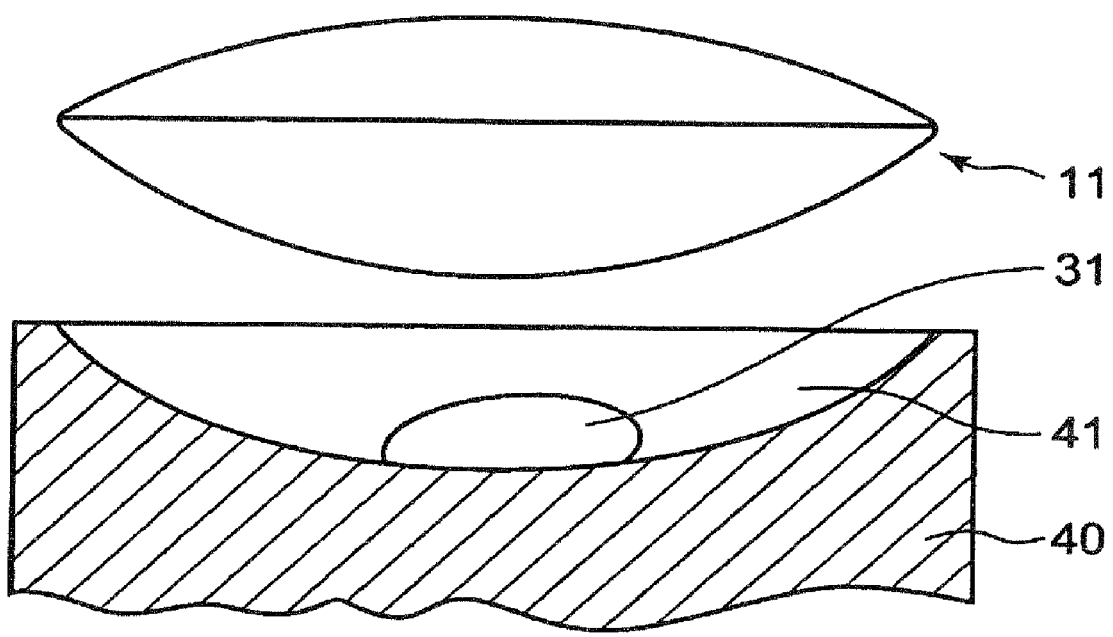
FIG. 1 is an exemplary drawing which shows a state resulting before a ceramic lens is placed on a mold as part of a process of manufacturing a ceramic hybrid lens according to the invention.

A ceramic hybrid lens is such as to form a convex ceramic lens 11 as shown in FIG. 1 by using a light transmitting ceramic having a refractive index of 2.08 relative the d line and an Abbe's number of 30.4, molding the ceramic into a tablet shape, roughly cutting the tablet shaped ceramic into a rough shape, sanding the roughly shaped ceramic to match finishing dimensions, grinding the same ceramic and removing a core.

Note that a light transmitting ceramic used as a glass material has, as an optical property with respect to a linear transmissivity, a transmissivity of about 70% near 400 nanometers and a transmissivity of about 95% in a range from 450 nanometers to 700 nanometers and is slightly colored yellow.

Figure 2:
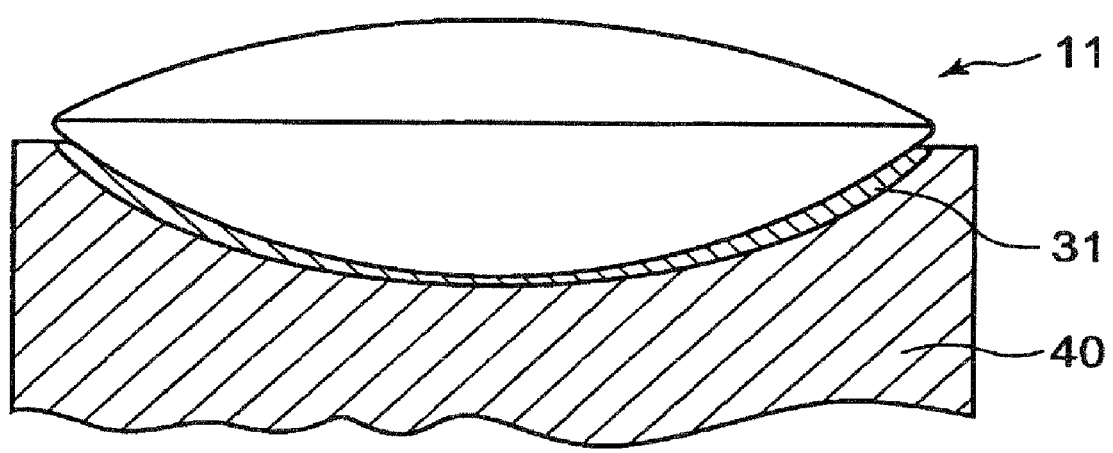
FIG. 2 is an exemplary drawing which shows a state in which the ceramic lens is placed on the mold as another part of the process of manufacturing the ceramic hybrid lens according to the invention.

In addition, the ceramic hybrid lens is such that a plastic lens 15 having an aspherical surface is affixed to the ceramic lens 11 so formed by placing a predetermined amount of ultraviolet curing resin 31 in an aspherical mold 40 having a recessed portion 41 whose surface is made into a required aspherical shape, spreading the resin 31 so place in such a manner as to coat the surface of the recessed portion 41 of the mold 40, thereafter, placing the ceramic lens 11, which constitutes a base material, in the recessed portion 41 so as to cause it to rest on the ultraviolet curing resin 31 as shown in FIG. 2, pressing the ceramic lens 11 to extend the ultraviolet curing resin 31 so that the ultraviolet curing resin 31 is formed into a lens shape which follows the shapes of a lower surface of the ceramic lens 11 and the recessed portion 41 of the mold, and radiating uniformly an ultraviolet ray having a wavelength of 360 nanometers to 380 nanometers via the ceramic lens 11 so as to cause the resin 31 to cure.

Figure 3:
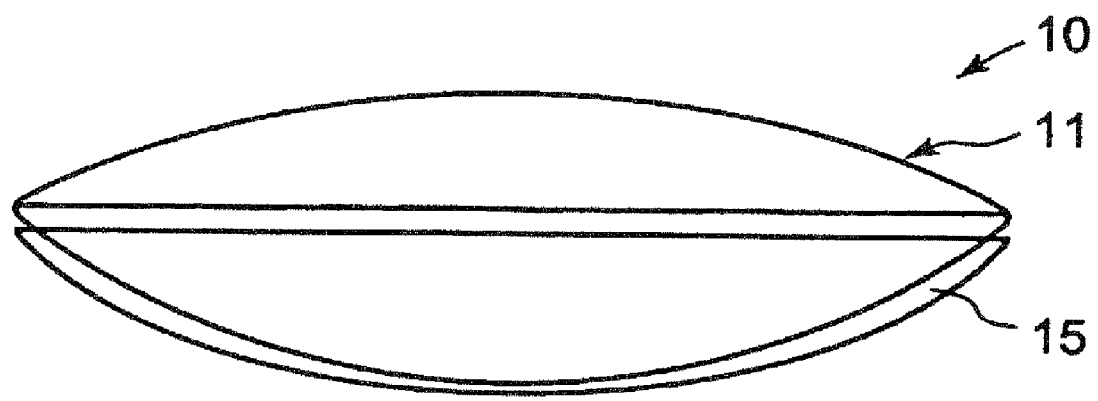
FIG. 3 is a drawing which shows an example of a ceramic hybrid lens according to the invention.

Then, the ultraviolet curing resin 31 so cured and molded is removed from the mold 40 together with the ceramic lens 11, whereby a hybrid lens 10 is provided in which a plastic lens 15 made of the ultraviolet curing resin 31 is affixed to one side of the ceramic lens 11 as shown in FIG. 3.

Note that as the ultraviolet curing resin 31, a light curing acrylic oligomer is used into which a light curing acrylic monomer as a reactive diluent and one of acetophenones as light a polymerization initiator or benzoyl ether and benzophenone, as well as a slight amount of polymerization promoter, parting agent and anti-foaming agent are added.

Figure 4:
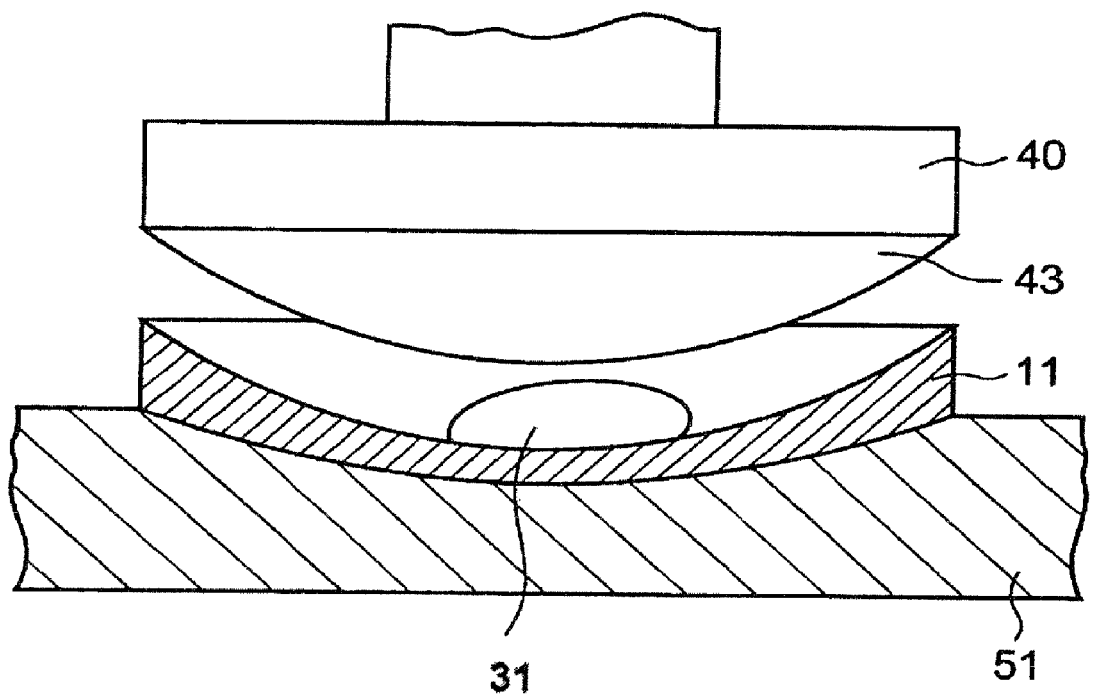
FIG. 4 is an exemplary drawing which shows the manufacturing of a ceramic hybrid lens of another shape according to the invention.

In addition, when a ceramic lens 11 having a concave surface formed thereon is used, as shown in FIG. 4, the ceramic lens 11 is placed on a pedestal 51 of such as an ultraviolet light transmitting glass, an ultraviolet curing resin 31 is placed in the concave surface of the ceramic lens 11 and the ultraviolet curing resin 31 so placed is then coated over the surface of the ceramic lens 11, the ultraviolet curing resin 31 so coated is then extended into a lens shape using an aspherical mold 40 having a lens molding surface 43 which is formed into an aspherical convex shape, an ultraviolet ray is radiated from a lens side via the pedestal 51 so as to cause the ultraviolet curing resin 31 to cure, and removing the mold 40 from the lens, whereby a hybrid lens 10 having a predetermined negative power is obtained.

In addition, for the ceramic lens 11, a light transmitting ceramic 21 is used which has a particle diameter of 40 micrometers to on the order of 120 micrometers, and as a glass material, a ceramic is used in which extremely few voids 25 (bubbles) exist between crystals, and the ceramic so used has, as an optical property with respect to a linear transmissivity, a transmissivity of about 70% near 400 nanometers which constitutes a visible radiation area, and a transmissivity of about 95% in a range from 450 nanometers to 700 nanometers.

Figure 5:
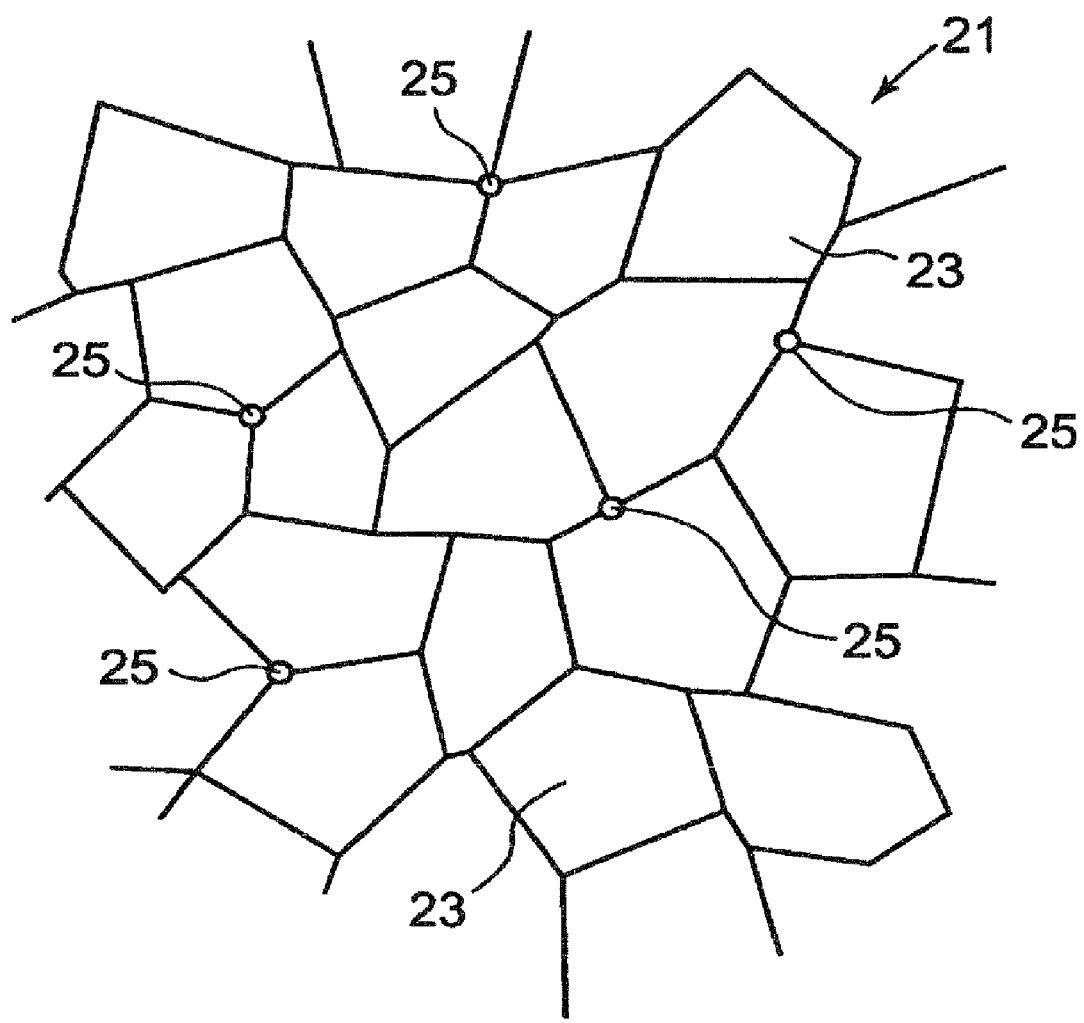
FIG. 5 is an exemplary drawing which shows a surface of a ceramic lens used in the invention.
Figure 6:
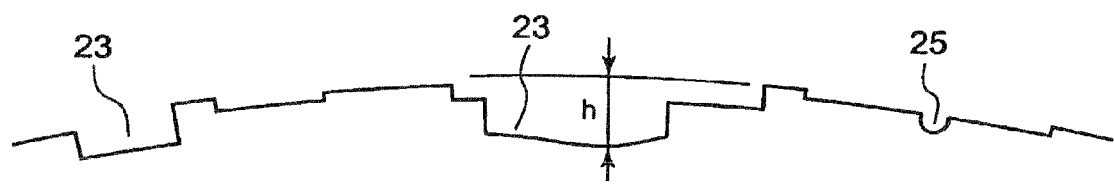
FIG. 6 is an exemplary drawing which shows a surface section of the ceramic lens used in the invention.

In addition, in grinding, in the event that a grinding is applied to the ceramic lens 11 so formed to such an extent that a mirror surface is produced on which chipping flaw 23 are formed to a depth h of on the order of 50 micrometers due to separation and fall of ceramic crystals, as shown in FIGS. 5 and 6, voids 25 and chipping flaw 23 are formed on the lens surface, and most of the lens surface can be finished extremely smoothly.

Thus, by using the ceramic having a particle diameter of 120 micrometers or smaller, MTF (modulation transfer function) of the ceramic lens 11 which uses a sine wave grating in which lines are drawn per 1 millimeter can be 70% or larger, and when the particle diameter was decreased down to or lower than 85 micrometers, MTF was able to reach and exceed 80%.

Figure 7:
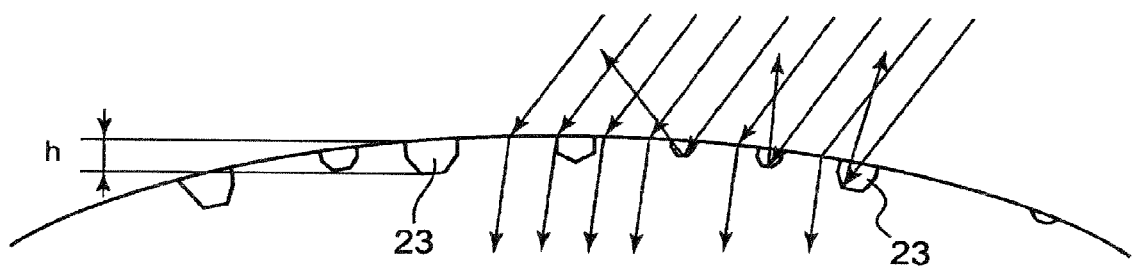
FIG. 7 is an exemplary drawing which shows reflection and refraction on the surface of the ceramic lens in the ceramic hybrid lens according to the invention.
Figure 8:
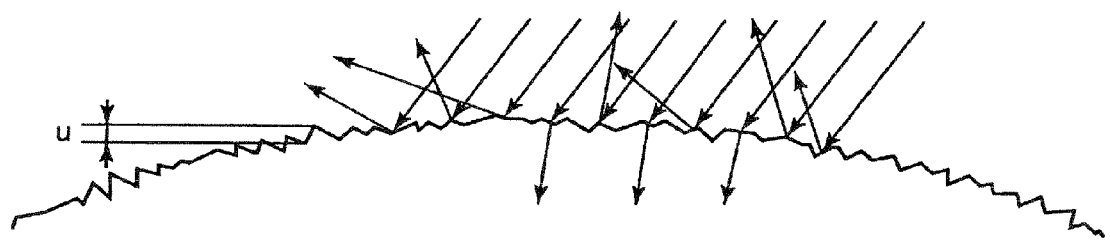
FIG. 8 is an exemplary drawing which shows how light is reflected and refracted on a surface of a glass lens.

Furthermore, when producing the ground surface, since grinding was such as to form chipping flaw 23 whose depth h was 50 micrometers to 60 micrometers depending on particle diameters, the joining force with the ultraviolet curing resin 31 could be increased, and as shown in FIG. 7, the other portions of the surface than portions where the chipping flaw 23 were formed in a scattering fashion were made smooth to thereby align light transmissions and refractions, whereby the ceramic lens could form a fine and bright image when compared to a glass whose surface roughness u becomes uniform as shown in FIG. 8 and could be rigidly joined to the plastic lens with a good image forming characteristic which corresponds to a surface roughness u of on the order of 20 micrometers.

What is claimed is:

1. A method for manufacturing a ceramic hybrid lens comprising:

forming a ceramic lens using as a glass material a light transmitting ceramic having a particle diameter of 40 micrometers to on the order of 120 micrometers by grinding the ceramic to finish a surface of the lens such that the surface has formed thereon particle departure marks having a depth in a range from 50 micrometers to on the order of 60 micrometers;

coating an ultraviolet curing resin to an aspherical mold and placing said surface of the ceramic lens on the resin so coated;

forcing the ceramic lens against the mold and radiating an ultraviolet ray so as to cause the ultraviolet curing resin to cure; and thereafter, removing the ultraviolet curing resin cured together with the ceramic lens from the mold.

2. A method for manufacturing a ceramic hybrid lens as set forth in claim 1, wherein, prior to the grinding, the ceramic is subjected to rough cutting and sanding.

3. A method for manufacturing a ceramic hybrid lens comprising:

forming a ceramic lens using as a glass material a light transmitting ceramic having a particle diameter of 40 micrometers to on the order of 120 micrometers by grindings the ceramic to finish a surface of the lens such that the surface has formed thereon particle departure marks having a depth in a range from 50 micrometers to on the order of 60 micrometers;

coating an ultraviolet curing resin to said surface of the ceramic lens so formed and forcing the ceramic lens against an aspherical mold;

radiating an ultraviolet ray from a ceramic lens side so as to cause the ultraviolet curing resin to cure; and thereafter, separating the mold from the ultraviolet curing resin so cured.

4. A method for manufacturing a ceramic hybrid lens as set forth in claim 3, wherein, prior to the grinding, the ceramic is subjected to rough cutting and sanding.

* * * * *